United States Patent Office 3,422,009
Patented Jan. 14, 1969

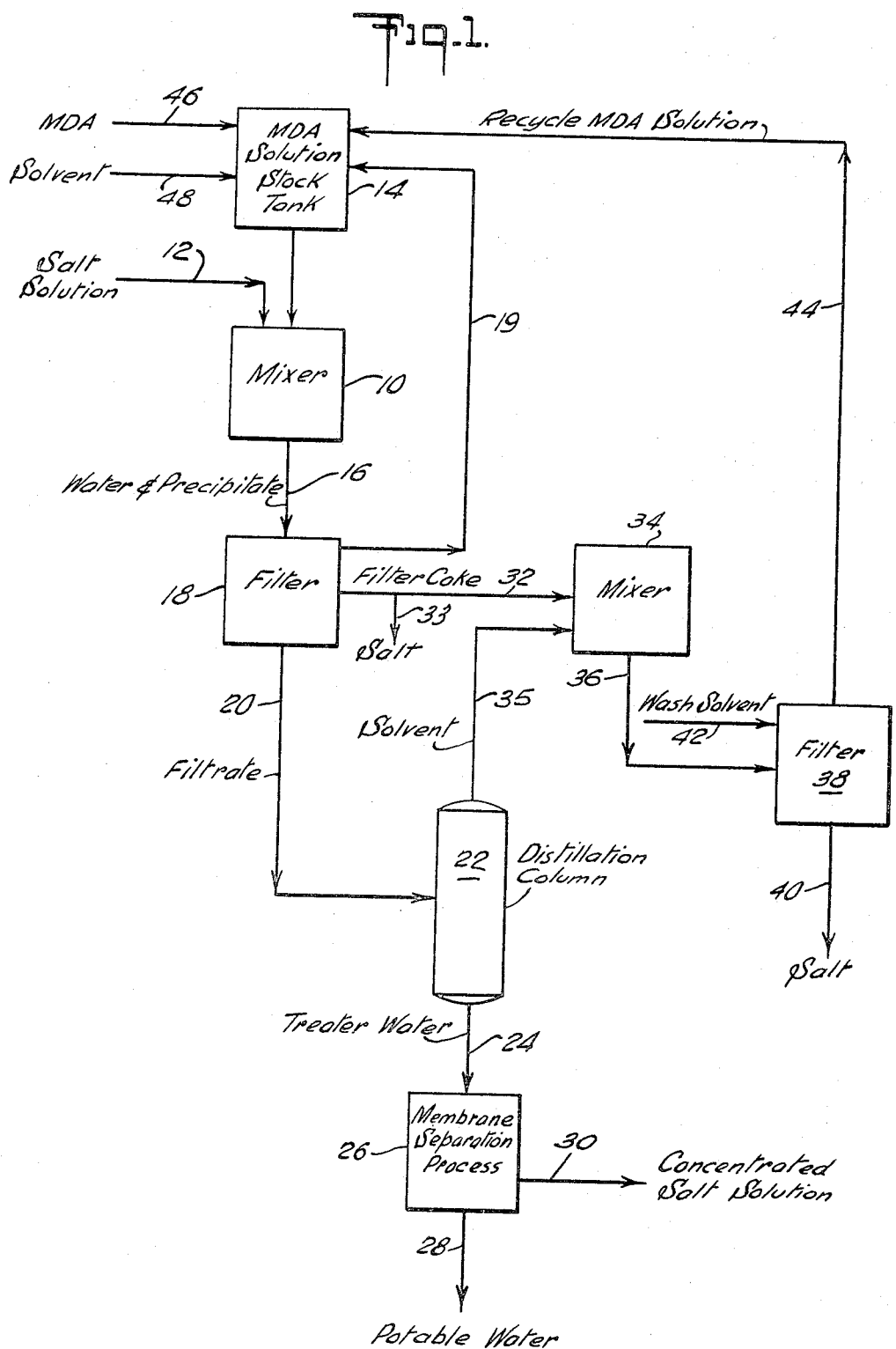

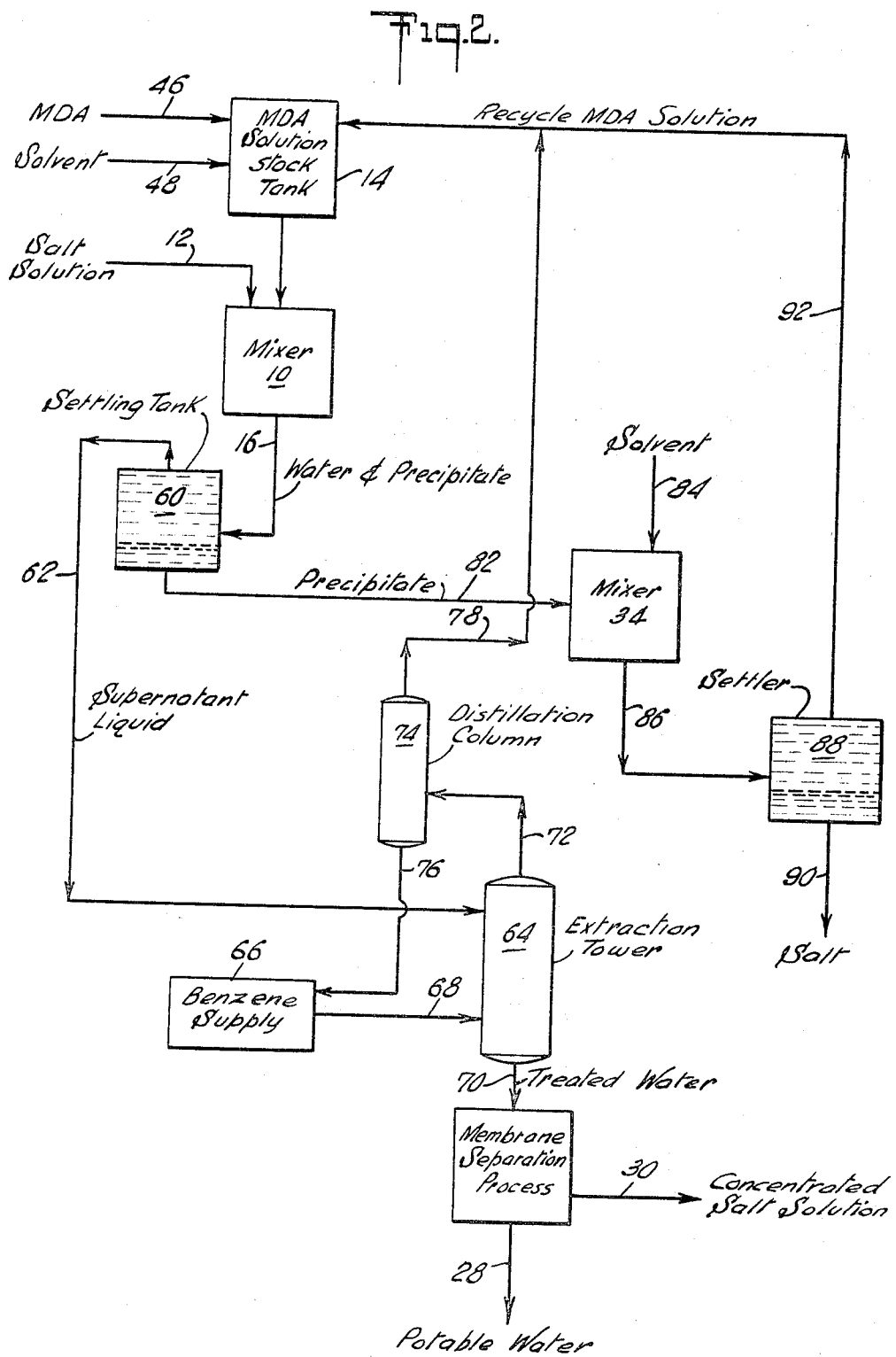

3,422,009
PROCESS FOR REMOVAL OF SALTS FROM AQUEOUS SOLUTIONS WITH METHYLENEDIANILINE
Frederic C. McCoy, Beacon, and Howard V. Hess, Glenham, N.Y., assignors to Texaco Inc., New York, N.Y., a corporation of Delaware
Filed June 28, 1967, Ser. No. 649,553
U.S. Cl. 210—23                11 Claims
Int. Cl. B01d 21/01

ABSTRACT OF THE DISCLOSURE

A process for removing certain sodium and lithium salts from aqueous solutions in the form of insoluble precipitates by reacting the soluble salts with a solution of 4,4'-methylenedianiline in a solvent having a mutual solubility for both water and methylenedianiline.

CROSS-REFERENCE TO RELATED APPLICATIONS

In copending patent application Ser. No. 649,480, filed concurrently herewith, there are disclosed compositions of matter prepared in accordance with the process of the present invention. In copending application Ser. No. 649,535, filed concurrently herewith, there is disclosed a method of forming water insoluble precipitates of sodium and lithium salts contained in concentrated brines to form a insoluble precipitate by reaction with solid methylenedianiline.

BACKGROUND OF THE INVENTION

Field of the invention

The present application relates to a process for the removal of certain sodium and lithium salts from their aqueous solutions.

Description of the prior art

In recent years the desalination of salt water has become a subject of increasing importance. Distillation of water from brines is a well known method of recovering water free from dissolved salts, but distillation of water is an expensive operation even with highly engineered heat recovery equipment. Treatment of salt water with ion exchange resins is an effective method of desalination but due to the very high cost this process has utility only for the treatment of water in relatively small quantities, as in survival kits. The so-called membrane separation processes such as electrodialysis and reverse osmosis are also effective but costly methods of desalination, with the cost of treatment bearing a substantially direct relationship to the amount of salt removed. These membrane processes would become more practical by operating on solutions of reduced salt content to produce potable water.

It has been reported by N. P. Marullo and R. A. Lloyd in the Journal of the American Chemical Society, vol. 88, pages 1076–1077 that simple sodium salts, such as sodium chloride, may be precipitated from aqueous solution by formation of a solid coordination compound with racemic p,p'-diamino-2,3-diphenylbutane. We have now discovered that, whereas amino compound of related structure generally do not possess this unique property, 4,4'-methylenedianiline forms an insoluble compound with certain sodium and lithium salts. There are important differences between this compound and p,p'-diamino-2,3-diphenylbutane which would not lead to the prediction that 4,4'-methylenedianiline is capable of reacting in a similar manner with simple sodium salts.

SUMMARY OF THE INVENTION

In accordance with the process of this invention, an aqueous solution or brine containing one or more sodium or lithium salts, for example, the chlorides, bromides, iodides, and nitrites is reacted at room temperature with a solution of 4,4'-methylenedianiline (also referred to hereinafter as MDA) in a solvent, preferably a ketone or alcohol, having a degree of mutual solubility for both water and for the MDA. A precipitate formed by interaction of the salt and MDA is removed, leaving a treated liquid of substantially reduced salt content. The precipitate, which has a 3:1 mol ratio of MDA to salt, is decomposed into its original constituents by adding additional solvent at an elevated temperature in the range of about 40 to 100° C., depending on the volatility of the solvent. The aqueous phase ordinarily contains a minor amount of the solvent for the MDA and this solvent may be removed either by distillation or by extraction with a second solvent having a very low solubility in water, such as benzene.

If desired, the MDA treated water, which usually contains from about 5,000–15,000 p.p.m. salt (0.5–1.5% by weight), may be further treated by passing it to one of the selective membrane separation processes such as electrodialysis or reverse osmosis.

Alo, if desired, the salt content of the precipitate may be recovered for mineral values and the solvent from the step of decomposing the complex may be recycled to the reaction operation.

The term "brine" is used herein in a broad sense to denote a wide range of concentrations of water-soluble inorganic salts in water, for example, natural saline water containing sodium chloride in concentrations in excess of about 1% to as high as the concentrations in saturated or nearly saturated brines typified by the brine in the Great Salt Lake or by brines obtained from wells. Sea water which contains about 3% salt is a particularly suitable saline solution for treatment in accordance with the process of the invention. The types of brines to which the process may be applied include aqueous solutions of dissolved sodium and lithium salts, for example, the chlorides, bromides, iodides and nitrites of these metals.

BRIEF DESCRIPTION OF THE DRAWINGS

For a fuller understanding of our invention reference may be had to the following description and claims, taken in conjunction with the accompanying drawings in which like parts are designated by like reference characters and in which:

FIGURE 1 is a schematic flow diagram illustrating one embodiment, and

FIGURE 2 is a schematic flow diagram illustrating a slightly different modification. Neither of these illustrations however is intended to be limiting in scope.

DESCRIPTION OF THE PREFERRED EMBODIMENTS

Detailed description of the drawings

With reference to FIGURE 1, an aqueous sodium chloride solution, e.g. sea water, is charged to mixer 10 by means of line 12. A solution of 4,4'-methylenedianiline (MDA) in a suitable solvent, e.g. acetone or methanol, is also charged to mixer 10 from MDA solution stock tank 14. The sodium chloride solution and MDA solution are mixed together in mixer 10 at a temperature in the neighborhood of 20° C. Under these conditions the MDA reeacts with the sodium chloride to form a crystalline precipitate consisting essentially of MDA and sodium chloride containing approximately 3 mols MDA for each mol sodium chloride. The resulting slurry is then discharged through line 16 into rotary filter 18 where the solid precipitate is separated from the mother liquor in the usual filtering type of operation. The filtrate, consisting essentially of treated water of reduced salt content and solvent from the MDA solution, is discharged from filter 18 through line 20 to distillation column 22 where the solvent is removed as an overhead stream and the water is withdrawn as a bottoms stream through line 24.

The treated water obtained from distillation column 22 may be used as such for many industrial purposes. If potable water is desired, the water obtained from distillation column 22 may be subjected to further purification by means of a selective membrane separation process 26, e.g. electrodialysis or reverse osmosis. Potable water is obtained through line 28 and the concentrated salt solution from membrane process 26 is recovered through line 30.

In the salt recovery portion of the process, the filter cake from filter 18 is discharged through line 32 into mixer 34 where it is mixed at an elevated temperature in the range of 40–100° C. with solvent obtained from the overhead solvent stream from distillation column 22 through line 35. Under the conditions in mixer 34, the crystalline MDA-salt precipitate is broken down into its component parts and the contents of the mixer are then discharged by way of line 36 into filter 38 where the salt is removed as filter cake which is discharged through line 40. During the filtering operation, the salt filter cake is washed free of MDA by the application of fresh wash solvent introduced through line 42. The filtrate-MDA solution is recycled by means of line 44 to MDA solution stock tank 14. The composition of the solution in stock tank 14 is adjusted by the addition of fresh MDA through line 46 or fresh solvent through line 48 as required.

If desired, the complex comprising the filter cake on filter 18 may be decomposed while it is still on the filtering surface of the rotary filter drum. This is accomplished by introducing hot solvent, e.g. acetone or methanol, to the filter and spraying the filter cake with the hot solvent. The resulting solvent-MDA solution is recycled to MDA solution stock tank 14 through line 19 and the salt remaining on the filter is removed as filter cake through line 33. This type of operation eliminates the need for mixer 34 and filter 38.

In the modification shown in FIGURE 2, an aqueous sodium chloride solution, e.g., sea water, is charged to mixer 10 by means of line 12 where it is mixed with a solution of 4,4'-methylenedianiline (MDA) in a solvent such as acetone or methanol from MDA solution tank 14. The sodium chloride solution and MDA solution are mixed together in mixer 10 at a temperature in the neighborhood of 20° C. and a crystalline precipitate consisting essentially of MDA and sodium cholride in approximately a 3:1 mol ratio obtained. The resulting slurry is then discharged to line 16 into a settling tank 60.

Supernatant liquid consisting essentially of treated water of reduced salt content and solvent for the MDA is discharged from the settling tank 60 through line 62 into an extraction tower 64 where the supernatant liquid is subjected to countercurrent extraction with a solvent having a negligible solubility in water, e.g., benzene, supplied to the extraction tower 64 through line 68. Treated water is withdrawn from the bottom of extraction tower 64 through line 70. This water has a substantially reduced salt content and may be used as such for many industrial purposes. However, if potable water is desired the MDA-treated water may be subjected to further treatment in a membrane separation process as described in connection with FIGURE 1.

The benzene extract from extraction tower 64 is withdrawn from the top of the tower through line 72 and charged to distillation column 74. When acetone or methl alcohol is used as the solvent for the MDA, benzene is withdrawn as a bottoms stream through line 76 and returned to benzene supply 66 while the MDA solvent is taken overhead through line 78 and returned to MDA solution stock tank 14. If a solvent for the MDA is used which has a higher boiling point than benzene, e.g. isopropyl alcohol, the benzene will be withdrawn as an overhead stream and the MDA solvent as a bottoms stream with appropriate changes in piping.

In the salt recovery portion of the process of FIGURE 2, the salt-MDA precipitate is removed from settling tank 60 through line 82 and transferred to mixer 34 where it is mixed with fresh solvent supplied through line 84. The temperature in mixer 34 is maintained preferably in the range of 40–100° C. in order to facilitate breaking of the precipitate into its component constituents. The resulting slurry of salt in MDA solution is withdrawn from mixer 34 through line 86 and fed into settler 88, where the salt is withdrawn from the bottom through line 90 and the supernatant MDA solution is withdrawn from the top through line 92 and recycled to MDA solution stock tank 14.

Examples

In one example, a 25 ml. portion of brine solution containing 2.96% by weight sodium chloride was mixed at room temperature with 100 ml. of a saturated solution of 4,4'-methylenedianiline dissolved in denatured ethyl alcohol, composed of 10 parts by volume of 95% ethyl alcohol and 1 part of methyl alcohol. A saturated solution at room temperature contains approximately 18% by weight of MDA. A crystalline precipitate formed which was separated from the mixture by filtration and was found to contain 9 wt. percent sodium chloride by analysis, the remaining 81 wt. percent of the precipitate appeared to be MDA. This weight ratio of sodium chloride to MDA is equivalent to a 1:3 mol ratio of sodium chloride to MDA. Table I shows some properties of the precipitate in comparison with corresponding properties of sodium chloride and MDA. After removal of the NaCl-MDA precipitate, the aqueous filtrate was extracted with four 200 ml. portions of benzene to remove the remaining alcohol. The treated water from this extraction analyzed 0.92 wt. percent NaCl, which was equivalent to approximately a two-thirds reductions in the original salt content.

The NaCl-MDA precipitate removed from the aqueous phase by filtration was then mixed with 200 ml. of denatured alcohol at a temperature of 50° C., under which conditions the precipitate was broken down into its constituents. Sodium choride crystals which formed were separated from the liquid phase by filtration.

In other tests, acetone and methyl alcohol were used with equal effectiveness. Since neither acetone nor methyl alcohol forms an azeotropic mixture with water, their use facilitates the recovery of the solvent from the treated water. Isopropyl alcohol, methyl Cellosolve, propylamine, and tetrahydrofuran were also used successfullly as solvents for the MDA.

In still other tests, 3% salt solutions of sodium bromide, sodium iodide, sodium nitrite, lithium chloride, lithium bromide and lithium iodide all reacted with MDA in the same manner with the MDA as did the sodium chloride described above. However, solutions of sodium fluoride, sodium nitrate, sodium thiocyanate, sodium acetate, sodium sulfate and sodium carbonate did not react with MDA to form a precipitate. Likewise potassium chloride, potassium iodide, potassium fluoride, potassium nitrate, calcium chloride and magnesium chloride in aqueous solutions failed to react with the MDA.

TABLE I

|  | NaCl | MDA (technical) | NaCl-MDA precipitate |
|---|---|---|---|
| Appearance | White crystals. | Brown crystals. | Tan crystals. |
| Melting point, °C | 1,413 | 93 | 170. |
| Solubility: |  |  |  |
| Water | V. sol | Sl. sol | Decomposes in hot water. |
| Acetone | V. sl. sol | V. sol | NaCl precipitates out. |
| Glacial acetic acid | V. sl. sol | V. sol | V. sol. |
| Benzene: |  |  |  |
| Cold | Insol | V. sol | V. sl. sol. |
| Hot | Insol | V. sol | Decomposes in boiling benzene. |

It is reported in the literature cited hereinabove that p,p'-diamino-2,3'diphenylbutane reacts with sodium nitrate. MDA does not. It is also reported that certain halides of potassium form adducts with p,p'-diamino-2,3'diphenylbutane. MDA, on the other hand, does not react with any potassium salts. It is also reported that only the racemic form of p,p'-diamino-2,3-diphenylbutane forms a complex with some of the simple sodium salts whereas the meso form is unable to coordinate. The p,p'-methylenedianiline of the present invention has no racemic form, but it is equivalent to a meso form in that the molecule is optically inactive and it cannot be separated into optically active isomers.

The following related amino type compounds were tried but none formed a precipitate with sodium chloride in 3% aqueous solution.

p,p'-diamino-1,2-diphenylethane
p,p'-diamino-2,2-diphenylpropane
rosaniline
rosaniline hydrochloride
pararosaniline
4,4'-dimethyldiaminobenzophenone
2,4-diaminodiphenylamine
4,4'-diaminodiphenylether
p,p'-diaminodiphenylsulfone
tetramethyldiaminodiphenylmethane
1,2-dianilinoethane
benzidine
oxydianiline
2,2'-dipyridylamine
2,2'-diaminodiphenylsulfide The foregoing unsuccessful tests show that the ability of amino compounds to form precipitates with sodium salts cannot be predicted.

The method of the invention is particularly well suited for continuous operations as shown in FIGURE 1 and FIGURE 2 for the desalination of sea water and for the recovery of sodium salt values from chemical brines. In general, the treated water product, as for example, from distillation column 22 of FIGURE 1 or extraction tower 64 of FIGURE 2, has a salt content in the range of from about 0.50 to 1.5% which is in the "brackish" region.

Obviously, many modifications and variations of the invention, as hereinbefore set forth, may be made without departing from the spirit and scope thereof, and therefore only such limitations should be imposed as are indicated in the appended claims.

We claim:
1. A process for reducing the salt content of an aqueous solution which comprises introducing 4,4'-methylenedianiline dissolved in an organic solvent into an aqueous solution to react said 4,4'-methylenedianiline with said salt to form a precipitate in an aqueous solution of reduced salt content and removing said precipitate from said aqueous solution of reduced salt content, said salt being selected from the group consisting of sodium chloride, sodium bromide, sodium iodide, sodium nitrite, lithium chloride, lithium bromide, lithium iodide and lithium nitrite.

2. The process of claim 1 wherein said organic solvent is an aliphatic alcohol having a boiling point below the boiling point of water.

3. The process of claim 1 wherein said organic solvent is a ketone having a boiling point below the boiling point of water.

4. The process of claim 1 wherein said organic solvent is tetrahydrofuran.

5. A process for desalination of brine containing a salt selected from the class consisting of the chlorides, bromides, iodides and nitrites of sodium and lithium which comprises treating said brine with a solution of 4,4'-methylenedianiline dissolved in a solvent having mutual solubility for both the 4,4'-methylenedianiline and for water to form a precipitate comprising said salt and said 4,4'-methylenedianiline, separating said precipitate from said treated brine and removing said solvent from said treated brine to obtain water of substantially reduced salt content.

6. The process of claim 5 wherein said solvent is removed from said treated brine by distillation.

7. The process of claim 5 wherein said separated precipitate is treated with a solvent for said 4,4'-methylenedianiline at a temperature in the range of 40° to 100° C. whereby said precipitate is resolved into its constituent parts consisting of salt and 4,4'-methylenedianiline.

8. The process of claim 5 wherein said separated precipitate is resolved into its constituent parts by distillation of the 4,4'-methylenedianiline component from the salt component.

9. The process of claim 5 wherein said treated brine is further treated in a membrane type separation process.

10. The process of claim 5 wherein said solvent is removed from said treated brine by extraction with a second solvent which is substantially insoluble in water.

11. The process of claim 10 wherein said second solvent is benzene.

References Cited

UNITED STATES PATENTS 3,342,728   9/1967   Malm et al. _____ 210—23

OTHER REFERENCES

Marullo, N. P., et al.: J. Amer. Chem. Soc. vol. 88, pp. 1076–1077 (1966), P.O.S.L.

MICHAEL E. ROGERS, Primary Examiner.

U.S. Cl. X.R.
23—38; 210—59